United States Patent
Inoue

(10) Patent No.: US 11,494,136 B2
(45) Date of Patent: Nov. 8, 2022

(54) STORAGE MEDIUM HAVING FINGERNAIL IMAGE PROCESSING, INFORMATION PROCESSING APPARATUS, AND CONTROL METHOD OF INFORMATION PROCESSING APPARATUS

(71) Applicant: CANON KABUSHIKI KAISHA, Tokyo (JP)

(72) Inventor: Yuichi Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/374,023

(22) Filed: Jul. 13, 2021

(65) Prior Publication Data

US 2022/0035576 A1 Feb. 3, 2022

(30) Foreign Application Priority Data

Jul. 31, 2020 (JP) .............................. JP2020-130541

(51) Int. Cl.
| | |
|---|---|
| *G06K 7/015* | (2006.01) |
| *G06F 3/12* | (2006.01) |
| *A45D 29/00* | (2006.01) |
| *A45D 44/00* | (2006.01) |
| *A45D 34/04* | (2006.01) |

(52) U.S. Cl.
CPC ............. *G06F 3/121* (2013.01); *A45D 29/00* (2013.01); *A45D 34/04* (2013.01); *A45D 44/005* (2013.01); *G06F 3/1234* (2013.01); *A45D 2029/005* (2013.01)

(58) Field of Classification Search
CPC ............. A45D 2029/005; G06F 3/1242; G06K 15/1885
USPC ...... 358/1.18, 1.12, 3.24, 504, 514; 382/312
See application file for complete search history.

(56) References Cited

U.S. PATENT DOCUMENTS

2016/0088197 A1* 3/2016 Yamasaki ............. H04N 5/225
348/142

FOREIGN PATENT DOCUMENTS

JP 2016-032773 A 3/2016

* cited by examiner

*Primary Examiner* — Jamares Q Washington
(74) *Attorney, Agent, or Firm* — Venable LLP

(57) ABSTRACT

An information processing apparatus detects a printing-target fingernail area from a first captured image, creates print data for performing printing in the detected fingernail area, and detects a printing-target fingernail area from a second captured image before transmitting the print data to a printer. The print data is corrected based on a difference between the first and second detection results. In addition, a change in position, gradient, and shape of a fingernail based on the first detection results and the second detection results is detected, and it is determined whether one of an amount of change in position, an amount of change in gradient, and an amount of change in shape of a fingernail is larger than or equal to a predetermined threshold value.

8 Claims, 10 Drawing Sheets

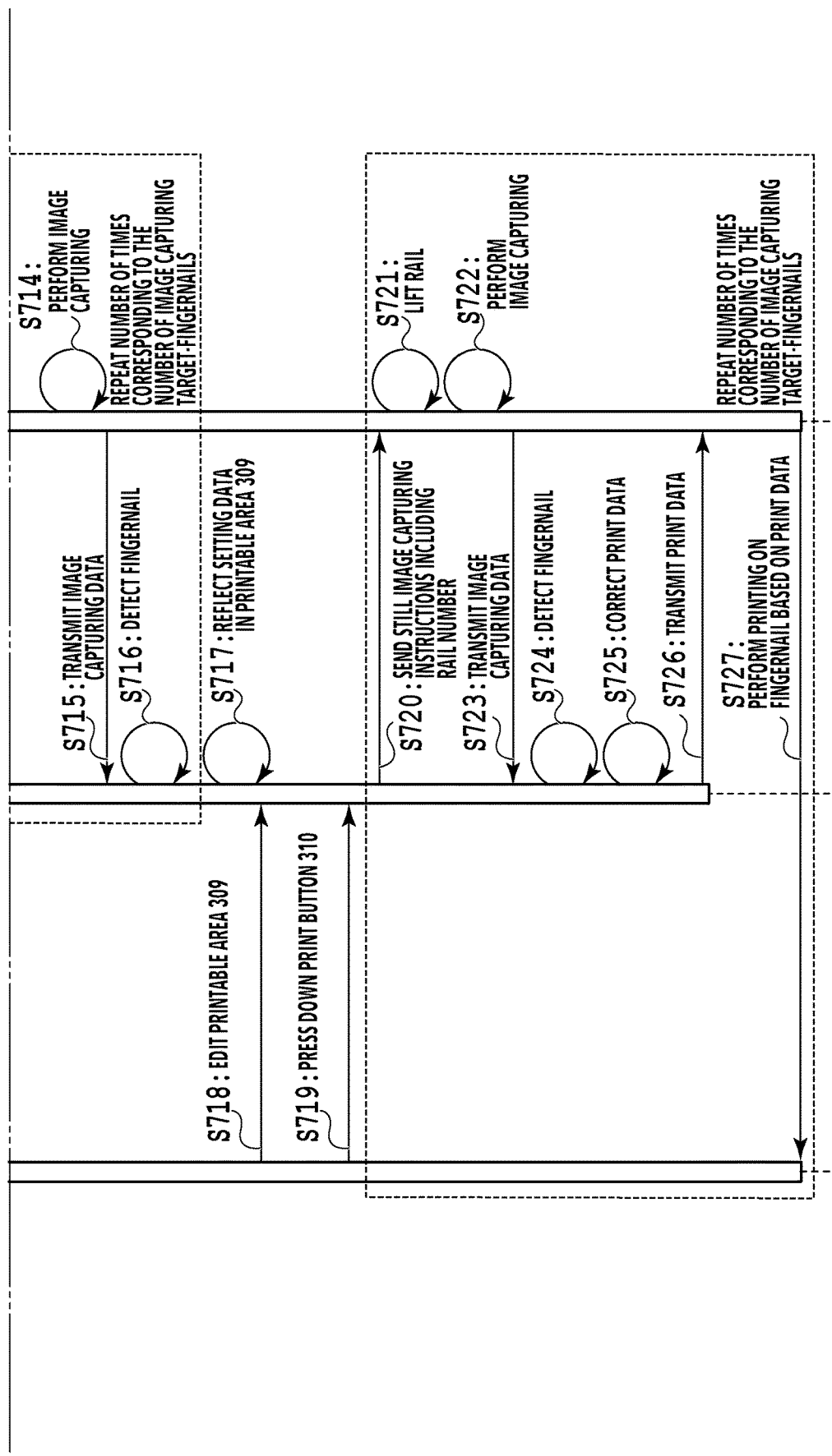

STORAGE MEDIUM HAVING FINGERNAIL IMAGE PROCESSING, INFORMATION PROCESSING APPARATUS, AND CONTROL METHOD OF INFORMATION PROCESSING APPARATUS

BACKGROUND OF THE INVENTION

Field of the Invention

The present disclosure relates to a technique of image processing for printing a nail art on a fingernail.

Description of the Related Art

In recent years, it has been made possible to print nail art on a fingernail by using a printer. In the following, a printer for printing nail art on a fingernail is referred to as a nail printer.

Japanese Patent Laid-Open No. 2016-32773 has disclosed a technique to resume printing, in a case where a change in the fingernail position is detected during the printing operation on the fingernail in a nail printer, by stopping the printing operation of the print head and adjusting the resumption position of printing after the change in the fingernail position stops.

SUMMARY OF THE INVENTION

However, in Japanese Patent Laid-Open No. 2016-32773, it is possible to deal with a case where the fingernail moves during printing, but in a case where the fingernail moves before printing, that is, in a case where the position or the like of the fingernail changes during the period from the detection of the printing-target fingernail area until printing is performed, it is not possible to print nail art correctly.

Consequently, in view of the above-described problem, an object of one embodiment of the present invention is to make it possible to perform printing on a fingernail correctly.

One embodiment of the present invention is a non-transitory computer readable storage medium storing a program for causing a computer of an information processing apparatus to function as: a first detection unit configured to detect a printing-target fingernail area from a first captured image; a creation unit configured to create print data for performing printing in a fingernail area detected by the first detection unit; a second detection unit configured to detect a printing-target fingernail area from a second captured image before transmitting the print data to a printer; and a correction unit configured to correct the print data based on a difference between first detection results by the first detection unit and second detection results by the second detection unit.

Further features of the present invention will become apparent from the following description of exemplary embodiments with reference to the attached drawings.

DESCRIPTION OF THE EMBODIMENTS

In the following, embodiments of the present disclosure are explained in detail. The following embodiments are illustrations for explaining the present disclosure and not intended to limit the present disclosure only to those embodiments. Further, it is possible to modify the present disclosure in a variety of manners as long as the modification does not depart from the gist thereof.

First Embodiment

<System Configuration>

A system in the present embodiment has an information processing apparatus and a printer. In the present embodiment, explanation is given by taking a tablet terminal as an example of the information processing apparatus. However, the information processing apparatus is not limited to the tablet terminal. As the information processing apparatus, it is possible to apply various devices, such as a mobile terminal, a note PC, a smartphone, a PDA (Personal Digital Assistant), and a digital camera. Further, in the present embodiment, as the printer, it is possible to apply, for example, an ink jet printer, a 3D printer and the like. The printer of the present embodiment may be a multifunction printer having a plurality of functions, such as the copy function, the FAX function, and the print function. The printer of the present embodiment has a function of performing drawing directly on a fingernail of a human hand. In the present embodiment, explanation is given by distinguishing the information processing apparatus and the printer as separate apparatuses, but an aspect may be accepted in which an apparatus having the functions of both apparatuses in an integrated manner is used.

Figure 1A:
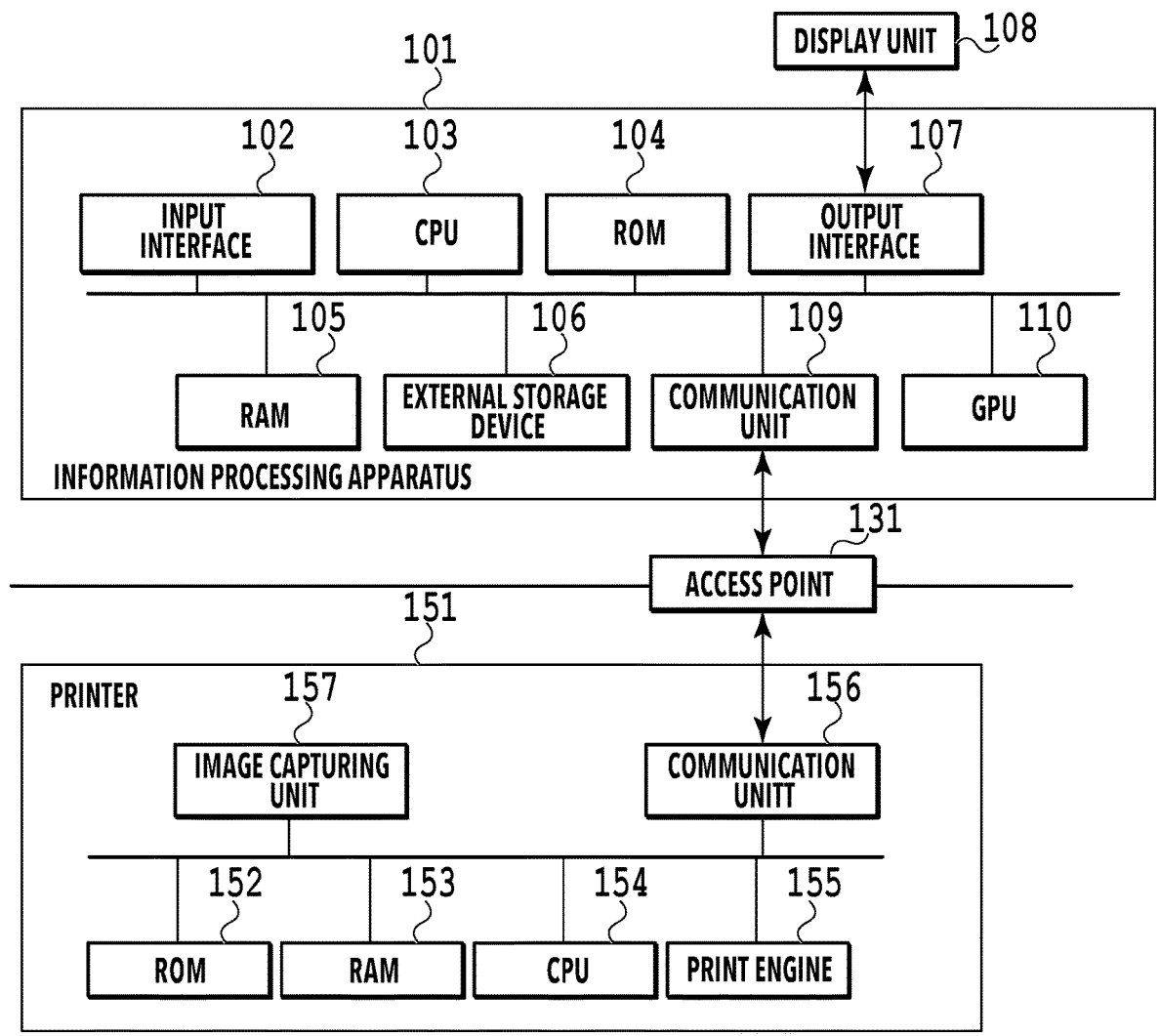
FIG. 1A and FIG. 1B are outline diagrams showing a configuration of a system.
Figure 1B:
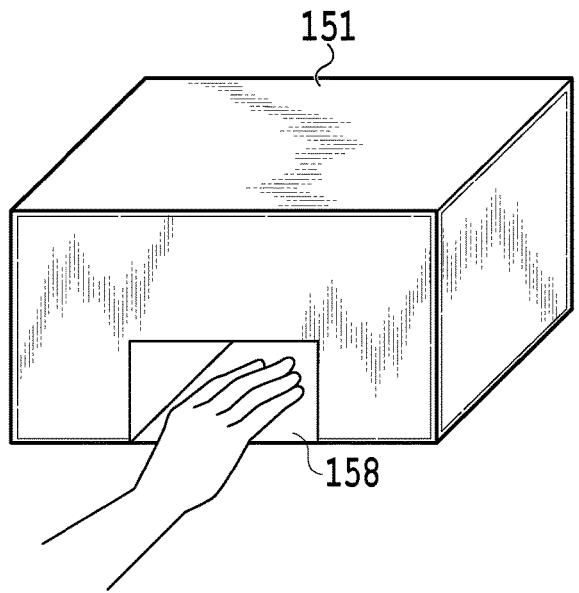

FIG. 1A and FIG. 1B are diagrams explaining the system having an information processing apparatus 101 and a printer 151 of the present embodiment. In FIG. 1A, a block diagram of the information processing apparatus 101 and the printer 151 is shown. In FIG. 1B, a schematic diagram of an outer appearance of the printer 151 is shown. In the following, by using FIG. 1A and FIG. 1B, the configuration of the information processing apparatus 101 and the printer 151 is explained.

<Information Processing Apparatus>

As shown in FIG. 1A, the information processing apparatus 101 has an input interface 102, a CPU 103, a ROM 104, a RAM 105, an external storage device 106, an output interface 107, a communication unit 109, and a GPU 110. These are connected to one another via a system bus.

The input interface 102 is an interface for receiving a data input and operation instructions from a user via an operation unit (not shown schematically) including a physical keyboard, buttons, a touch panel and the like. The aspect of the information processing apparatus 101 in the present embodiment is such that a display unit 108, to be described later, and at least part of the operation unit are integrated into one unit and for example, the output of a screen and the reception of an operation from a user are performed on the same screen.

The CPU 103 is a system control unit and controls the entire information processing apparatus 101, such as the execution of programs and activation of hardware. In the ROM 104, control programs executed by the CPU 103, data tables, a built-in operating system (in the following, referred to as OS), and data of programs and the like are stored. In the present embodiment, each control program stored in the ROM 104 performs software execution control, for example, such as scheduling, task switch, and interrupt processing, under the management of the built-in OS stored in the ROM 104.

The RAM 105 includes an SRAM (Static Random Access Memory), a DRAM (Dynamic Random Access Memory) or the like. In the RAM 105, data may be stored by a primary battery for data backup, not shown schematically. In that case, it is possible to store data of program control variables and the like in the RAM 105 without volatilizing the data. Further, in the RAM 105, a memory area is also provided, which stores setting information on the information processing apparatus 101, management data on the information processing apparatus 101, and the like. Furthermore, the RAM 105 is also used as a main memory and a work memory of the CPU 103.

In the external storage device 106, an application that provides a printing execution function, a printing information generation program that generates printing information that the printer 151 can interpret, and the like are stored. Further, in the external storage device 106, various programs, such as an information transmission and reception control program that performs transmission and reception of information with the printer 151 connected via the communication unit 109, and various kinds of information that these programs use, and the like are stored.

The output interface 107 is an interface that performs control of the display of data by the display unit 108, the notification of the state of the information processing apparatus 101, and the like.

The display unit 108 has an LED (Light-Emitting Diode), an LCD (Liquid Crystal Display) or the like and performs the display of data, the notification of the state of the information processing apparatus 101, and the like. It may also be possible to receive an input from a user via the display unit 108 by installing a soft keyboard having keys, such as a numerical value input key, a mode setting key, a determination key, a cancellation key, and a power source key, on the display unit 108. Further, the display unit 108 may be configured as a touch panel display as described previously. The display unit 108 is connected with the system bus of the information processing apparatus 101 through the output interface 107.

The communication unit 109 is configured so as to perform data communication by connecting with an external device, such as the printer 151. It is possible for the communication unit 109 to connect to an access point (not shown schematically) within the printer 151. That is, in the present embodiment, it is possible for a communication unit 156 within the printer 151 to operate as an access point. The access point is an example and what is required is that the communication unit 156 operates as a master station at the time of performing wireless communication in conformity to the IEEE 802.11 series, and for example, the communication unit 156 may operate as a group owner of Wi-Fi Direct. By the communication unit 109 connecting to the access point within the printer, it is made possible for the information processing apparatus 101 and the printer 151 to perform wireless communication with each other. It may also be possible for the communication unit 109 to perform direct communication with the printer 151 by wireless communication or to communicate with the printer 151 via an external access point (access point 131) existing outside. As the wireless communication method, mention is made of, for example, Wi-Fi (Wireless Fidelity) (registered trademark), Bluetooth (registered trademark) and the like. Further, as the access point 131, mention is made of, for example, a device such as a wireless LAN router. In the present embodiment, the method in which the information processing apparatus 101 and the printer 151 connect directly to each other without the intervention of the external access point 131 is called the direct connection method. Further, the method in which the information processing apparatus 101 and the printer 151 connect to each other via the external access point 131 is called the infrastructure connection method. The aspect may also be one in which the information processing apparatus 101 and the printer 151 are connected via a wire, such as a USB cable.

It is possible for the GPU 110 to perform an efficient calculation by performing parallel processing of more data, and therefore, in a case where a learning model, such as deep learning, is processed, it is effective to perform the processing with the CPU 110. Consequently, in the present embodiment, the GPU 110 is used relating to the processing using a learning model, in addition to the CPU 103. Specifically, in a case where a learning program including a learning model is performed, the learning model is processed by the CPU 103 and the GPU 110 performing the calculation in cooperation with each other. In the processing using a learning model, the calculation may be performed by only one of the CPU 103 and the GPU 110.

In the present embodiment, it is assumed that the information processing apparatus 101 stores a predetermined application in the ROM 104, the external storage device 106 or the like. The predetermined application is an application program for transmitting a print job for printing nail art data to the printer 151 in response to, for example, the operation from a user. The application that has the function such as this is called a nail application hereinafter. The nail application may have another function in addition to the print function. For example, the nail application in the present embodiment may have a function to activate a camera of an image capturing unit 157 of the printer 151 by communicating with the printer 151. That is, the nail application may have a function to transmit a camera activation job to the printer 151, and the like, other than the print job. Further, the predetermined application stored in the ROM 104, the external storage device 106 or the like is not limited to the nail application and may be an application program having a function other than printing.

<Printer>

The printer 151 has a ROM 152, a RAM 153, a CPU 154, a print engine 155, the communication unit 156, and the image capturing unit 157. These components are connected to one another via a system bus. As shown in FIG. 1B, in the printer 151, a printing target insertion unit 158 that is a space for inserting a printing target is provided. FIG. 1B shows the way a user inserts his/her own hand into the printing target insertion unit 158. As described above, in the present embodiment, it is supposed that a human hand is inserted into the printing target insertion unit 158. Further, in the present embodiment, the printing target is a fingernail. In the printing target insertion unit 158, four rails for placing fingers are mounted and it is possible to insert one to four fingers. The four rails are designed so as to be capable of lifting and lowering. Consequently, by the rail lifting before printing, it is possible to adjust the height of a fingernail at the height optimum for printing. This lifting and lowering operation is performed by instructions from the nail application. In the present specification, an example is shown in which the hand fingernail is the printing target, but it is also possible to apply the present embodiment also to a case where printing is performed on a nail of a foot, not limited to a hand.

In the ROM 152, control programs executed by the CPU 154, a data table, and data of the OS program and the like are stored. In the present embodiment, each control program stored in the ROM 152 performs software execution control, such as scheduling, task switch, and interrupt processing, under the management of the built-in OS stored in the ROM 152.

The RAM 153 includes an SRAM, a DRAM or the like. In the RAM 153, data may be stored by a primary battery for data backup, not shown schematically. In this case, it is possible to store data of program control variables and the like in the RAM 105 without volatilizing the data. Further, a memory area that stores setting information on the printer 151, management data on the printer 151, and the like is also provided in the RAM 153. Furthermore, the RAM 153 is also used as a main memory and a work memory of the CPU 154 and it is possible for the RAM 153 to temporarily store printing information received from the information processing apparatus 101. various kinds of information and the like.

The CPU 154 is a system control unit and controls the entire printer 151 by executing programs and activating hardware. The print engine 155 forms an image on a printing-target medium, such as a fingernail, which is inserted into the printing target insertion unit 158 by using a printing material, such as ink, based on the information stored in the RAM 153 or the print job received from the information processing apparatus 101.

It is possible for the communication unit 156 to operate as an access point for performing wireless communication by the direct connection method with an external apparatus, such as the information processing apparatus 101. It is possible for this communication unit 156 to connect with the communication unit 109 of the information processing apparatus 101. It may also be possible for the communication unit 156 to directly communicate with the information processing apparatus 101 by wireless communication or communicate with the information processing apparatus 101 via the external access point 131. In a case where the communication unit 156 connects with the external access point 131 by the infrastructure connection method, the communication unit 156 operates as a slave station and the external access point 131 operates as a master station. Further, the communication unit 156 may have hardware that functions as an access point or the communication unit 156 may operate as an access point by software for causing the communication unit 156 to function as an access point.

The image capturing unit 157 is a device having an image capturing function and belongs to the printer 151 and is installed therein. The image capturing unit 157 has a function to capture a predetermined area including a printing target (specifically, fingernail) that is inserted into the printing target insertion unit 158 and send the captured image (still image, moving image and the like) to the information processing apparatus 101 real time. In the present embodiment, the image capturing unit 157 captures a moving image and a still image and is a camera module having at least a lens and an image sensor. The lens collects light rays from the printing target that is inserted into the printing target insertion unit 158 and forms an image on the image sensor. The image sensor converts the light rays collected by the lens into an electrical signal that the CPU 154 can process. It may also be possible to use a smartphone, a mobile terminal, a digital camera or the like in place of the camera module as a device having the image capturing function in a case where the device has the function such as this. The print engine 155 performs printing for the printing target that is inserted into the printing target insertion unit 158.

It may also be possible to attach a memory, such as an external HDD or an SD card, to the printer 151 and the information stored in the printer 151 may be stored in the memory. Further, the configuration shown in FIG. 1A and FIG. 1B is merely exemplary and each of the information processing apparatus 101 and the printer 151 may have components other than those described previously, but explanation thereof is omitted here.

Definition of Terms

Next, terms that are used in the present embodiment are explained. The present embodiment is an aspect in which nail art is printed mainly on a fingernail. Further, the present embodiment is an aspect in which nail art is printed on each fingernail of one hand. In general, the nail art that is printed on each fingernail has the same concept, but there is a case where the nail art that is printed on each individual fingernail is not exactly the same nail art. For example, in a nail art set of design A, ten nail arts (nail arts corresponding to each fingernail of ten fingers) are included and the ten nail arts have the common design concept, but there is a case where the patterns are not exactly the same. In view of the above-described points, in the present embodiment, terms are defined as follows.

"nail image data": refers to image data of a nail art that is printed on one fingernail.

"nail art data": refers to an aggregate of a plurality of pieces of nail image data. That is, the nail art data can also be said as a dataset of a plurality of pieces of nail image data. Typically, the nail art data is image data aggregating images of each piece of nail image data corresponding to the nail arts of ten fingernails of the right hand and the left hand together. The nail art data may be data aggregating each of ten pieces of nail image data (that is, a set of ten pieces of image data) or may be image data obtained by combining each of ten pieces of nail image data into one image.

As described above, it is assumed that in a case where "nail image data" is referred to, the data of the image of the nail art of each individual fingernail is referred to, and in a case where "nail art data" is referred to, data of a set of images of ten nail arts is referred to.

<Outline of Printing of Nail Art>

In the present embodiment, the nail application is activated by the CPU 103 of the information processing apparatus 101 executing the program of the nail application stored in the ROM 104 or the external storage device 106. Then, by using the nail application, it is possible for a user to print a nail art on a fingernail by reflecting the nail image data included in the nail art data selected by the user him/herself in the printable area. That is, the following series of operations is performed by using the nail application. (1) A user selects a set of nail image data (that is, nail art data) on the application. (2) The application activates the camera located inside the nail printer. (3) The application displays the camera image transmitted from the nail printer. (4) The user inserts his/her hand into the nail printer. (5) The application detects the area of the fingernail from the camera image and sets the area of the fingernail on which the nail art is printed. (6) The application reflects the nail image data included in the nail art data in the set printable area. (7) The user edits the printable area in a case of adjusting the set printable area. (8) The application causes the nail printer to perform printing by using the reflected image data. A user who inserts his/her hand into the printer 151 and a user who operates the application may be the same user or different users.

<Graphical User Interface of Nail Application>

In order to make understanding easy, a graphical user interface (in the following, described as GUI) screen that is displayed in the nail application is explained first. The GUI screen that is explained in the following is displayed on the display unit 108 by the CPU 103 that executes the nail application. Further, explanation is given on the assumption that the input interface 102 functions as the operation unit integrated with the display unit 108 into one unit. The GUI screen of the nail application in the present embodiment is roughly divided into three kinds (referred to as first to third GUI screens). The first GUI screen is a nail art data selection screen shown in FIG. 2. The second GUI screen is a nail image data setting screen shown in FIG. 5. The third GUI screen is a print data creation screen shown in FIG. 3. In the following, by using each screen, the GUI screens of the nail application are explained.

Figure 2:
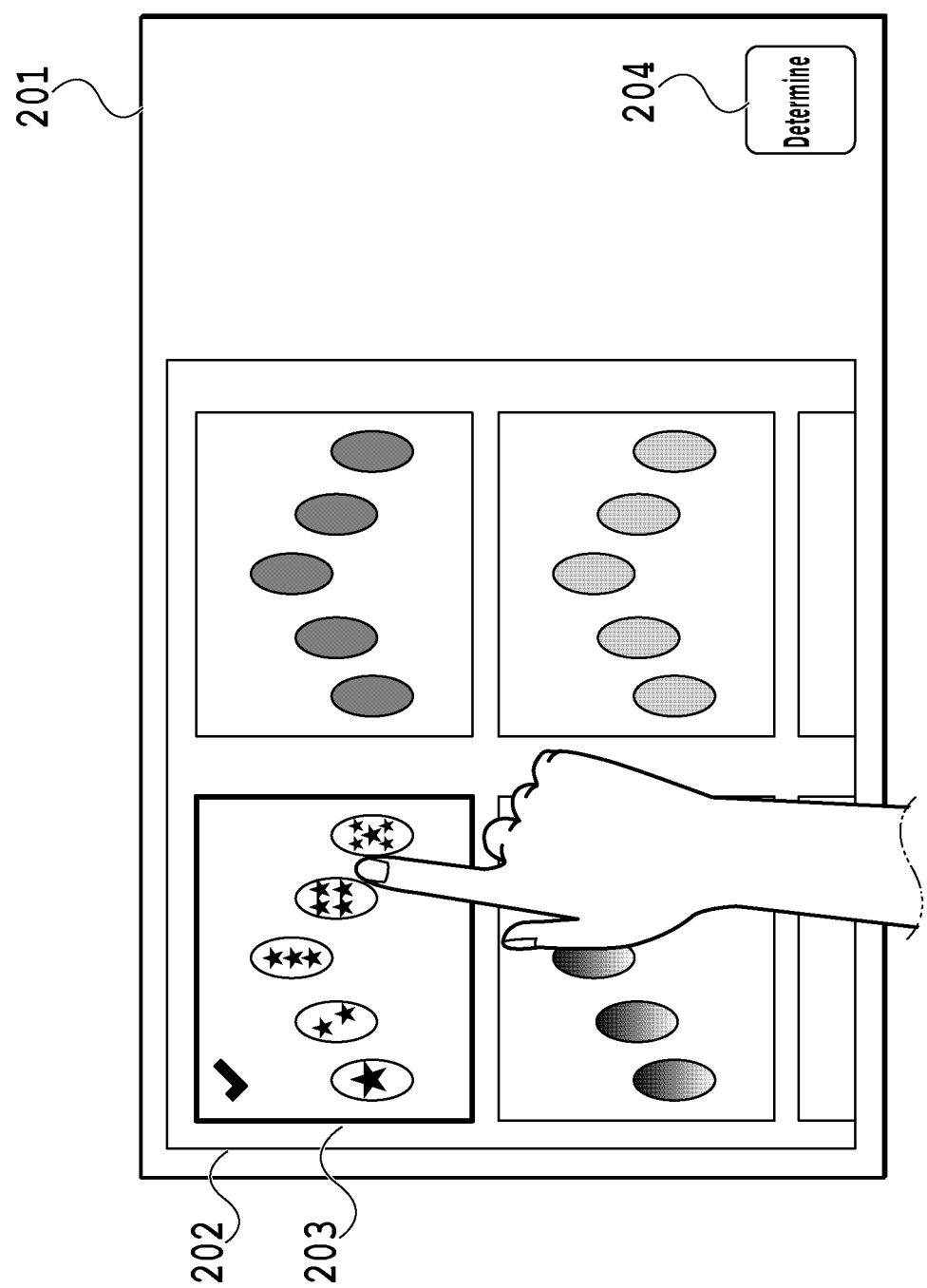
FIG. 2 is a diagram showing a nail art selection screen.

FIG. 2 is a diagram showing a nail art data selection screen 201 as an example of the first GUI screen. As shown in FIG. 2, the nail art data selection screen 201 has a nail art data display area 202 and a Determine button 204.

In the nail art data display area 202, a plurality of pieces of nail art data corresponding to each design concept of a nail art that is printed on each fingernail is displayed. Specifically, on the screen in FIG. 2, four pieces of nail art data 203 are displayed. In one piece of the nail art data 203, ten kinds of nail image data corresponding to each of the fingernails of the thumbs, the index fingers, the middle fingers, the third fingers, and the little fingers of the left hand and the right hand are included. It is possible for a user to select one piece or a plurality of pieces of the nail art data 203 and also cancel the selected nail art data 203. As an example of the method in which a user selects or cancels the nail art data 203, it is possible for a user to select the nail art data 203 by tapping the nail art data 203 once. Further, it is possible for a user to cancel the selected state by tapping the selected nail art data 203 once again.

Figure 5:
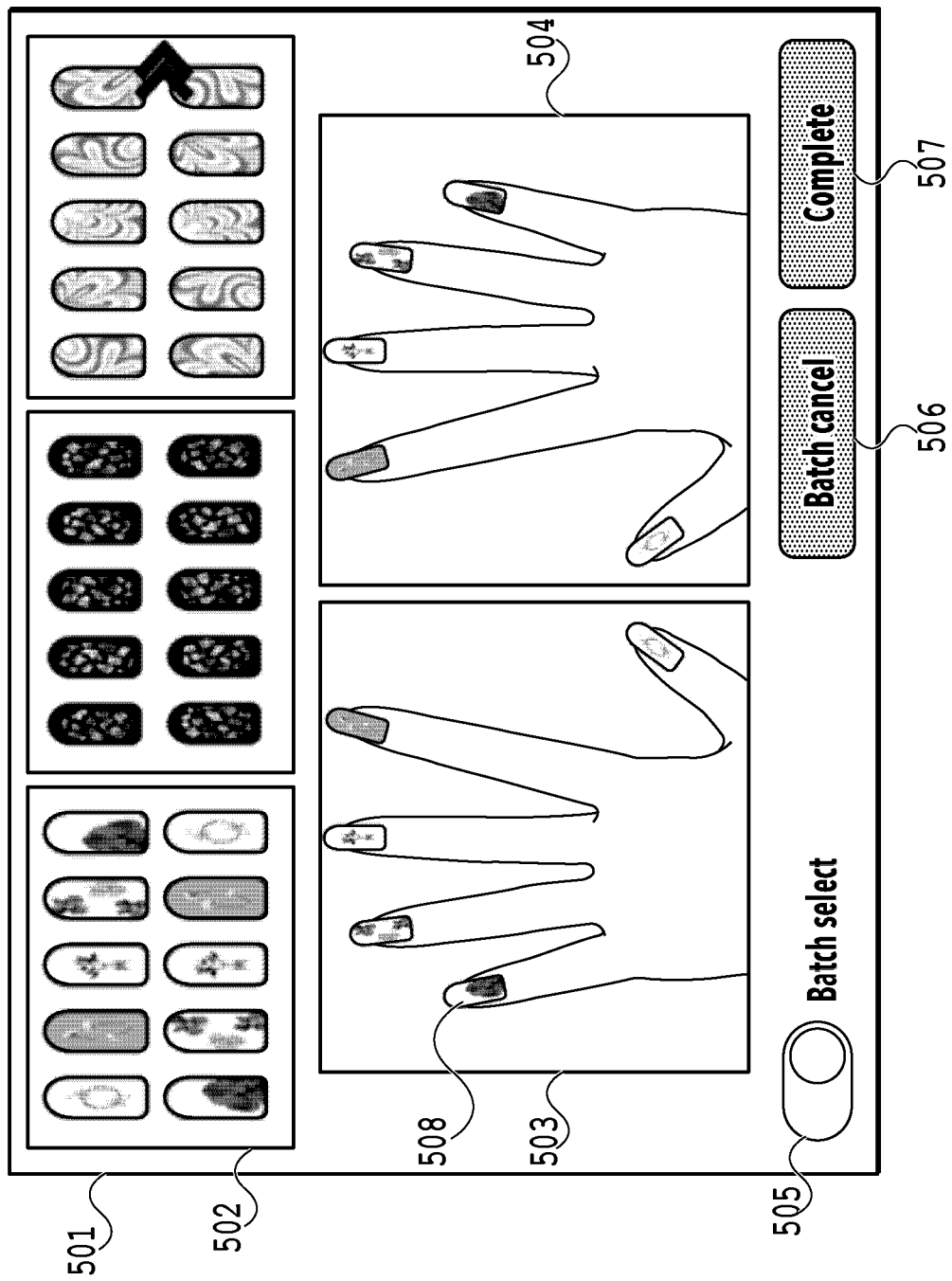
FIG. 5 is a diagram showing a nail image data setting screen.

In a case where a user presses down the Determine button 204 after selecting one piece or a plurality of pieces of the nail art data 203 from the nail art data display area 202, a nail image data setting screen 501 shown in FIG. 5 is displayed in place of the nail art data selection screen 201.

In the present embodiment, explanation is given on the assumption that in a case where various buttons are operated, the operation is referred to as "press down" operation and in a case where each area is operated, the operation is referred to as "tap" operation, "touch" operation, "pinch-in" operation, "pinch-out" operation and the like as the operation of the touch panel, but these are merely exemplary. For example, the press down operation of various buttons may be implemented by touching various buttons on the touch panel. Further, for example, each area may be operated by the cursor operation using a mouse or the like. Furthermore, the input interface 102 may have various direction-indicating buttons and the operation of each area may be performed by using the direction-indicating buttons.

FIG. 5 is a diagram showing the nail image data setting screen 501 as an example of the second GUI screen. As shown in FIG. 5, the nail image data setting screen 501 has a nail art data display area 502, a left hand preview area 503, a right hand preview area 504, a selection mode changeover switch 505, a selection cancellation button 506, and a setting completion button 507.

The nail art data display area 502 is an area that displays the nail art data selected by a user on the nail art data selection screen 201.

In the left hand preview area 503, a total of five fingernail areas 508 of the thumb to the little finger of the left hand are included and in the right hand preview area 504, a total of the five fingernail areas 508 of the thumb to the little finger of the right hand are included. A user selects nail art data or nail image data from the nail art data display area 502. Due to this, it is possible to reflect the selected nail art data or nail image data in the fingernail area 508 in the left hand preview area 503 and the right hand preview area 504.

The selection mode changeover switch 505 is a switch to change over the methods of selecting nail art data or nail image data that is reflected in the fingernail area 508 included in the left hand preview area 503 and the right hand preview area 504. In a case where a batch selection mode is ON, it is possible to reflect at a time the nail art data selected by a user from the nail art data display area 502 in the fingernail areas 508 included in the left hand preview area 503 and the right hand preview area 504, respectively. In a case where the batch selection mode is OFF, it is possible to reflect the nail image data selected by a user from the nail art data display area 502 in one of the fingernail areas 508 included in the left hand preview area 503 or the right hand preview area 504.

The selection cancellation button 506 is a button that can be selected in a case where nail image data is already reflected in at least one of the fingernail areas 508 included in the left hand preview area 503 and the right hand preview area 504. In a case where a user presses down the selection cancellation button 506, the selection of all reflected nail image data is cancelled and the state returns to the state where no nail image data is selected.

The setting completion button 507 is a button that can be selected in a case where nail image data is reflected in one or more of the fingernail areas 508 included in the left hand preview area 503 and the right hand preview area 504. In a case where a user presses down the setting completion button 507, a print data creation screen 301 shown in FIG. 3 is displayed in place of the nail image data setting screen 501.

Figure 3:
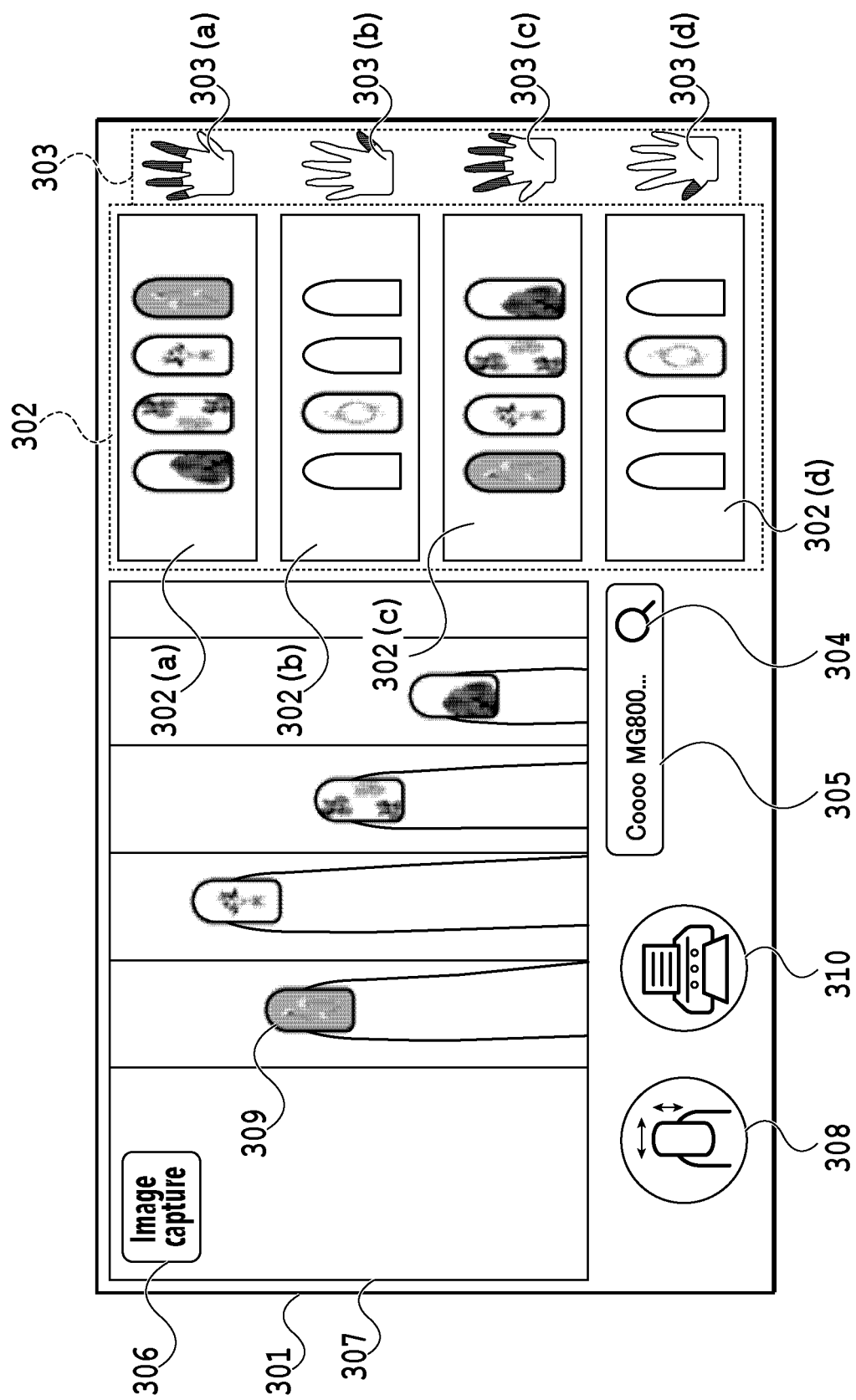
FIG. 3 is a diagram showing a print data creation screen.

FIG. 3 is a diagram explaining the print data creation screen 301 for creating print data as an example of the third GUI screen. The print data creation screen 301 has a setting data display area 302, a printing-target display area 303, a printer search button 304, a printer name display area 305, an Image capture button 305, a preview area 307, a printable area setting button 308, and a print button 310. In the preview area 307, a printable area 309, to be described later, is included.

The setting data display area 302 is an area that displays the nail image data set on the nail image data setting screen 501 shown in FIG. 5 by dividing the nail image data into four areas at most of the data of the left hand and the right hand. FIG. 3 shows an aspect, as an example of the method of dividing the setting data, in which the data is displayed as one combination of the index finger, the middle finger, the third finger, and the little finger of the left hand, one combination of the thumb of the left hand, one combination of the index finger, the middle finger, the third finger, and the little finger of the right hand, and one combination of the thumb of the right hand. In the setting data display area 302 in FIG. 3, the display is shown in a case where the nail image data is set for all the fingernails of the left hand and the right hand. As shown schematically, in the setting data display area 302, setting data 302(*a*) of the index finger, the middle finger, the third finger, and the little finger of the left hand and setting data 302(*b*) of the thumb of the left hand are displayed. Further, in the setting data display area 302, setting data 302(*c*) of the index finger, the middle finger, the third finger, and the little finger of the right hand and setting data 302(*d*) of the thumb of the right hand are also displayed. In each area of the setting data 302(*a*) to 302(*d*), four slots in which nail image data is input are provided.

In the printing-target display area 303, four icons indicating which fingernail each of the setting data 302(*a*) to 302(*d*) corresponds to are displayed. That is, as in the setting data display area 302, the four icons are displayed as one combination of the index finger, the middle finger, the third finger, and the little finger of the left hand, one combination of the thumb of the left hand, one combination of the index finger, the middle finger, the third finger, and little finger of the right hand, and one combination of the thumb of the right hand. As described previously, in the printing-target display area 303 shown in FIG. 3, the display is shown in a case where the nail image data is set for all the fingernails of the left hand and the right hand. An icon 303(*a*) indicates that the setting data 302(*a*) corresponds to the index finger, the middle finger, the third finger, and the little finger of the left hand and an icon 303(*b*) indicates that the setting data 302(*b*) corresponds to the thumb of the left hand. An icon 303(*c*) indicates that the setting data 302(*c*) corresponds to the index finger, the middle finger, the third finger, and the little finger of the right hand and an icon 303(*d*) indicates that the setting data 302(*d*) corresponds to the thumb of the right hand.

In a case where the printer search button 304 is pressed down by a user, processing to search for a printer capable of communicating with the nail application is performed. As a result of the search, in a case where one or a plurality of printers including the printer 151 is discovered, the nail application displays information specifying each of the discovered printers. The information specifying the discovered printers is displayed in a list and it is possible for a user to select one arbitrary printer from the list (here, it is assumed that a user selects the printer 151).

The printer name for uniquely identifying the selected printer 151 is displayed in the printer name display area 305. It is possible for the nail application to automatically search for the printer and display the printer list also in a case where the screen transitions to the print data creation screen 301 in the state where no printer is registered not only in a case where a user presses down the printer search button 304.

The Image capture button 306 is a button for communicating with the printer 151 displayed in the printer name display area 305 by being pressed down by a user and receiving a moving image captured by the image capturing unit 157 of the printer 151 real time and displaying the moving image in the preview area 307. In the present embodiment, it is assumed that a human hand is inserted into the printing target insertion unit 158. Because of this, for example, by a user inserting his/her one hand and pressing the Image capture button 306 with the other hand, the image of the top of the user's hand including the fingernails is displayed real time in the preview area 307. An image, such as a moving image, is displayed in the preview area 307 is not necessarily limited to a case where the Image capture button 306 is pressed down. For example, a case is considered where the nail application is capable of communicating with the printer 151 at the time of transition to the print data creation screen 301 in the state where the printer 151 is already registered. In this case, it is possible for the nail application to receive a moving image captured by the image capturing unit 157 of the printer 151 by automatically communicating with the printer 151 at the time of transition to the print data creation screen 301.

The use described previously is an example and another use can also be considered. For example, the GUI screen 501 may have an image capturing button and a user of a nail salon inserts his/her one hand and an employee of the nail salon presses down the image capturing button on the UI screen 501.

The printable area setting button 308 is a button for moving to the area setting mode to set the printable area 309 by being pressed down by a user in a case where a moving image is being displayed in the preview area 307.

Figure 4:
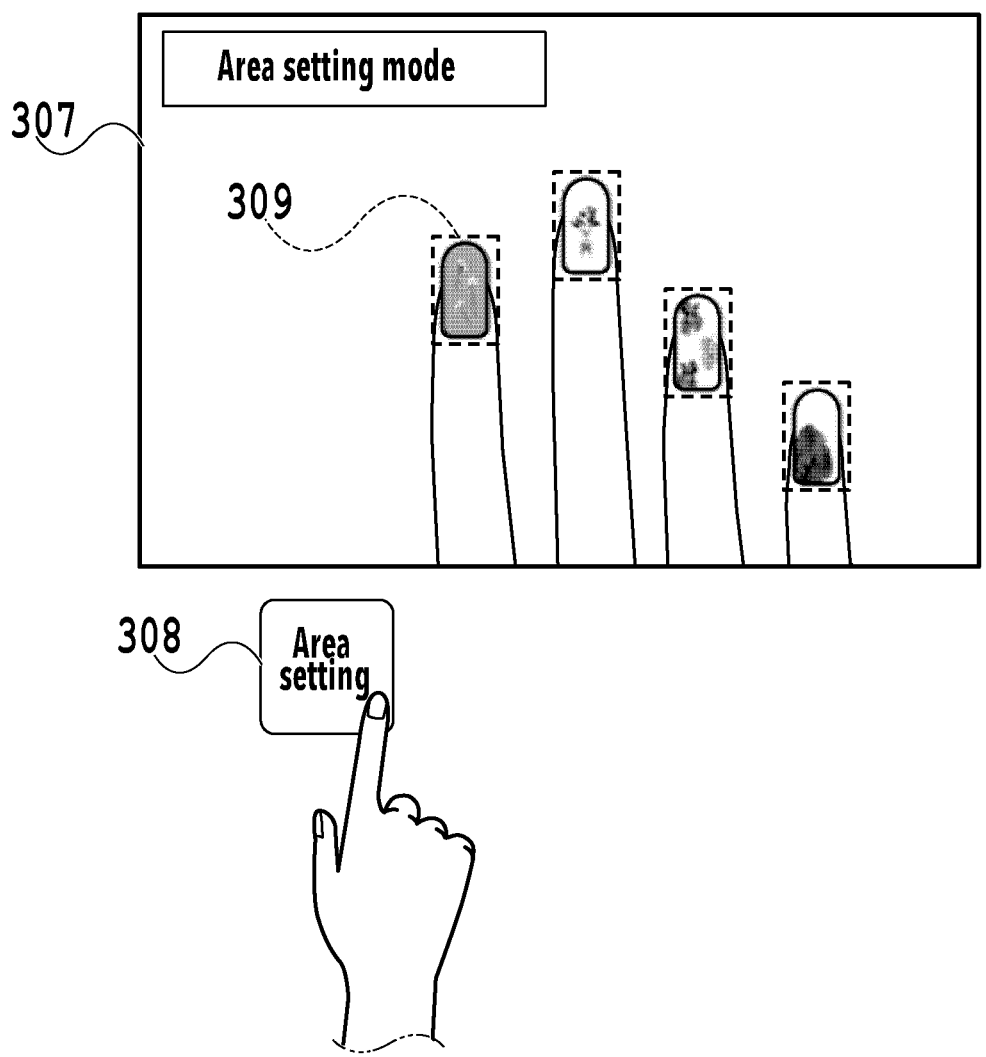
FIG. 4 is a diagram explaining an area setting mode that sets a printable area.

In response to the printable area setting button 308 being pressed down, the mode moves to the area setting mode capable of setting the printable area 309. FIG. 4 is a diagram explaining an example in which the fingernail area is automatically detected from a still image and the printable area 309 is automatically set as an example of the method of automatically detecting a fingernail area.

Specifically, first, a user sets the preview area 307 to the area setting mode by pressing down the printable area setting button 308. Then, the CPU acquires the still image of the hand including the fingernails of the user from the printer 151, which is acquired by the image capturing unit 157 performing image capturing, and automatically sets the printable area 309 by automatically detecting the fingernail area from the still image. As an example of the automatic detection method, it may also be possible to use a learning model created by machine learning. The learning model that is used here is a learning model that outputs results of detecting the fingernail area in a case where a still image including fingernails is input. The nail application outputs the results of detecting the fingernail area from the still image. The output fingernail area is automatically set as the printable area 309 as shown in FIG. 4. Further, the detection of the fingernail area is performed for each finger and for example, in a case of four fingers, the fingernail area detection is performed four times. At the time of displaying the printable area 309, which is detection results, an image (referred to as finger image) for each finger is displayed in the preview area 307 and for example, in a case of four fingers, four finger images are displayed in the preview area 307. The printable area 309 is displayed on the finger image and the one printable area 309 is set and displayed for each finger image.

After the setting of the printable area 309, the setting data selected by a user from the setting data display area 302 is automatically reflected in the printable area 309.

It is possible for a user to freely change the size of the printable area 309. Further, it is also possible for a user to delete the set printable area 309. There may be a case where the fingernails onto which a user desires to print the nail art are the fingernails of all the fingers of the hands or a case where they are the fingernails of part of the fingers. Because of this, in the present embodiment, it is made possible for a user to set the desired printable area 309. Further, in the present embodiment, as the printing target on which an image is reflected, the fingernail of a user is supposed, and therefore, there is a possibility that the size of the set printable area 309 is different from one another. Consequently, in the present embodiment, it is possible to print nail art at the appropriate position of a fingernail by a user inserting his/her hand into the printer 151 and setting the size or the like of the printable area 309 while checking the actual image of the fingernail. The printable area 309 that is set once may be followed in the subsequent image recognition processing and the like. For example, in a case where the position of the finger (or fingernail) changes within the printer 151 after a user sets the printable area 309, the printable area 309 may change automatically following the image area of the set printable area 309.

The print button 310 on the print data creation screen 301 is a button for giving instructions to start printing. In a case where the print button 310 is pressed down, the nail application creates the print data for performing printing on the fingernail based on the setting data selected by a user from the setting data display area 302, which is reflected in the printable area 309. Then, the nail application transmits the created print data to the printer 151 displayed in the printer name display area 305. In the case shown in FIG. 3, the print data is created by extracting the four printable areas 309 from the preview area 307. The printer 151 performs printing on the fingernail based on the print data sent from the nail application.

<Configuration of Information Processing Apparatus>

Figure 6:
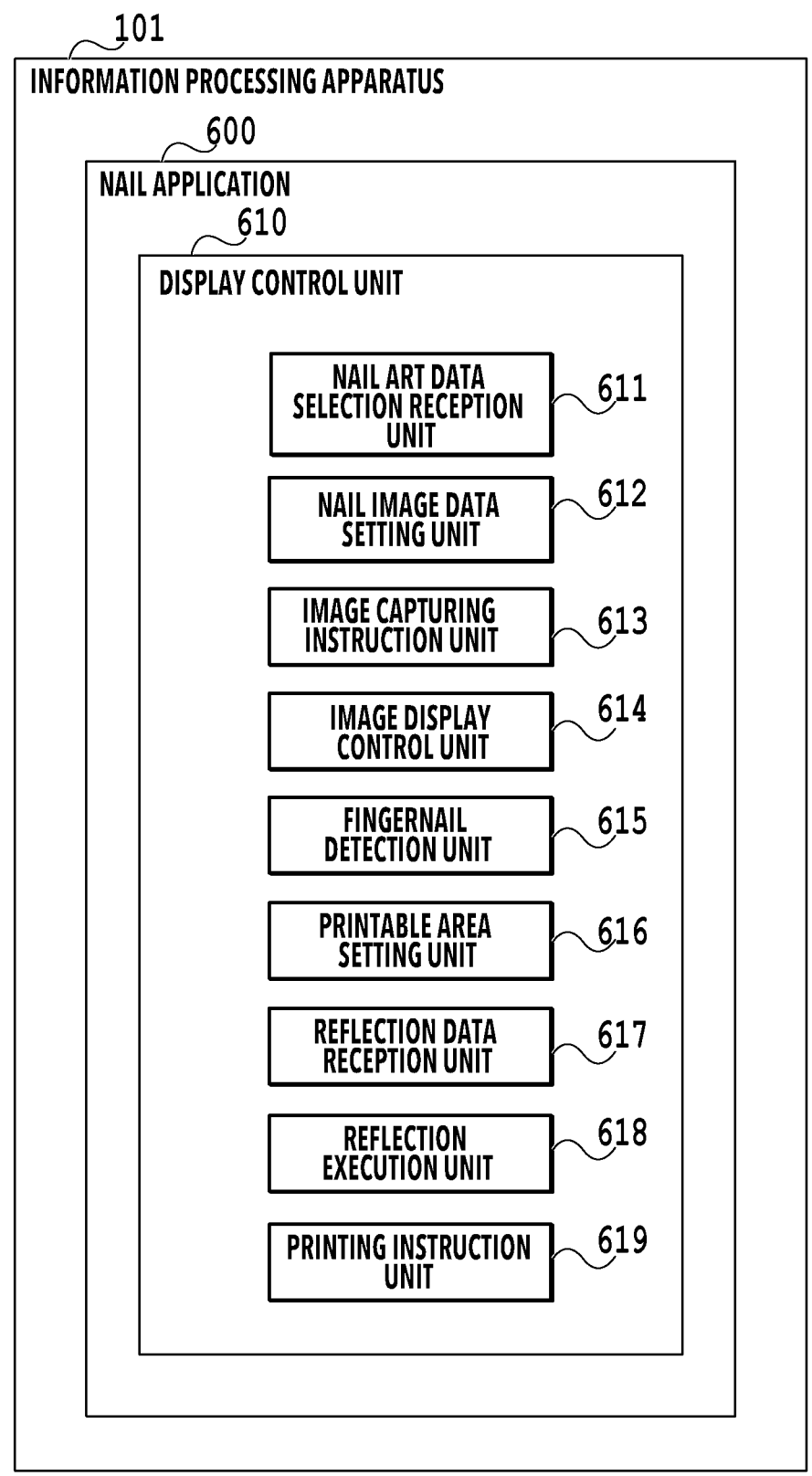
FIG. 6 is a function block diagram of an information processing apparatus.

FIG. 6 is a function block diagram showing the software configuration of the information processing apparatus 101 for implementing the functions described previously. The information processing apparatus 101 has a nail application 600. By the CPU 103 of the information processing apparatus 101 executing the program of the nail application 600, which is stored in the ROM 104 or the external storage device 106, it is made possible to cause the CPU 103 to perform each function of the nail application 600.

The nail application 600 has a display control unit 610. The display control unit 610 has a function to display the GUI screens including the nail art data selection screen 201 shown in FIG. 2, the nail image data setting screen 501 shown in FIG. 5, and the print data creation screen 301 shown in FIG. 3 on the display unit 108. Further, the display control unit 610 has the function of the input interface 102 and performs various kinds of control in accordance with the operation instructions that are input by a user.

The display control unit 610 has a nail art data selection reception unit 611, a nail image data setting unit 612, an image capturing instruction unit 613, an image display control unit 614, a fingernail detection unit 615, a printable area setting unit 616, a reflection data reception unit 617, a reflection execution unit 618, and a printing instruction unit 619.

The nail art data selection reception unit 611 receives a selection of the nail art data 203 from a user and acquires the selected nail art data 203 as shown in FIG. 2. The nail image data setting unit 612 acquires the nail image data that is set by a user in the fingernail areas 508 in the left hand preview area 503 and the right hand preview area 504 as shown in FIG. 5. The image capturing instruction unit 613 detects the pressing down of the Image capture button 306 in FIG. 3 or the transition to the print data creation screen 301 in the state where the printer 151 is registered and instructs the printer 151 to capture a moving image in accordance with the detection. The image display control unit 614 controls the display in the preview area 307 based on the image data, such as the moving image transmitted from the printer 151. The fingernail detection unit 615 performs fingernail detection and outputs the printable area 309 based on results of the fingernail detection. The printable area setting unit 616 sets the printable area 309 on the preview area 307 in accordance with instructions from a user. The reflection data reception unit 617 receives the setting data selected by a user from the setting data display area 302 and associates the selected setting data and the printable area 309 with each other. The reflection execution unit 618 reflects the setting data selected by a user from the setting data display area 302 in the corresponding printable area 309. The printing instruction unit 619 creates print data for the printer 151 to perform printing based on the setting data reflected in the printable area 309 and transmits the created print data to the printer 151.

<Flow of Processing>

Figures 7, 7A, 7B:
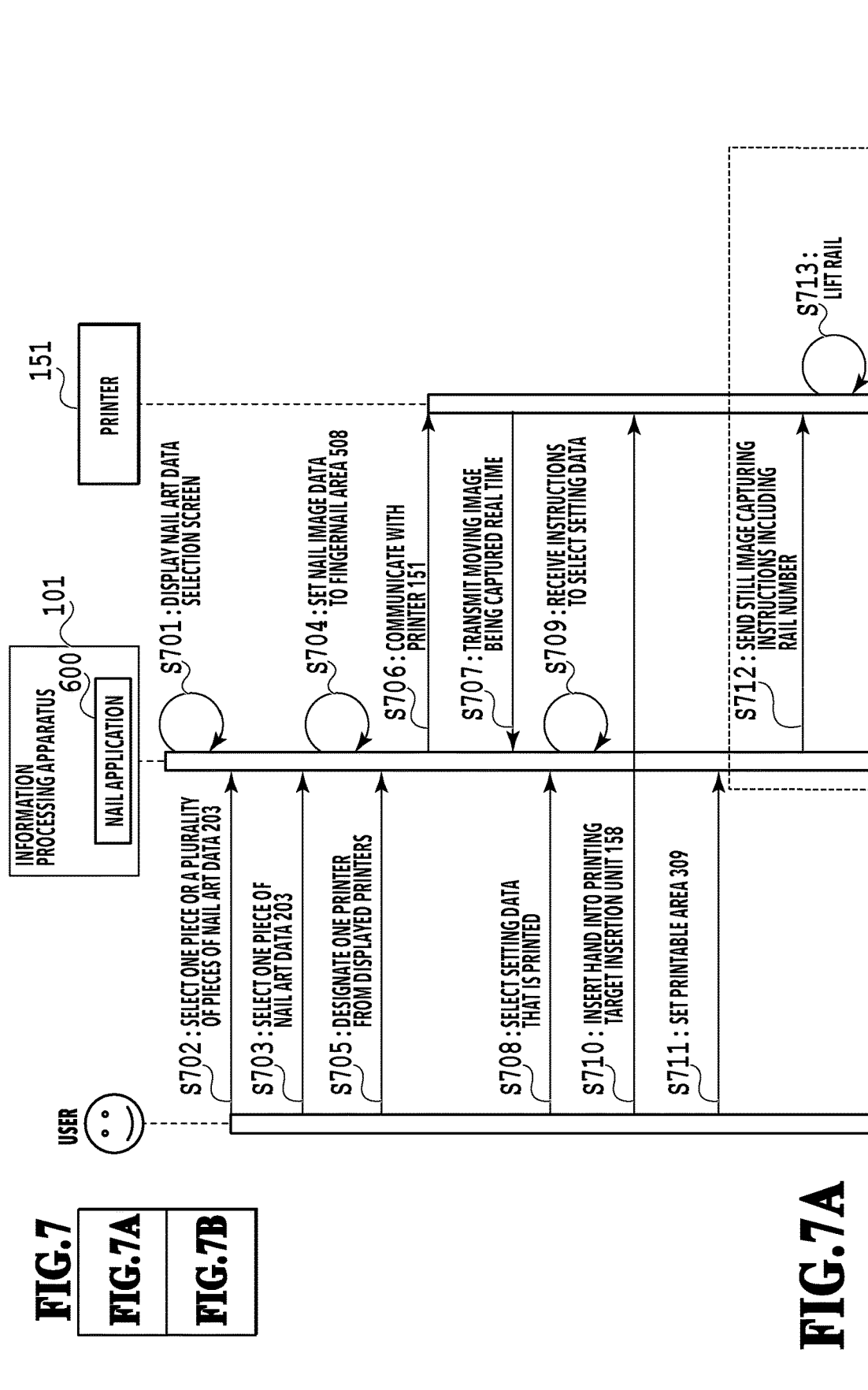
FIG. 7A and FIG. 7B indicate a sequence diagram showing a flow of processing.

FIG. 7A and FIG. 7B indicate a sequence diagram showing an example of the processing in the present embodiment. The processing of the nail application 600 in FIG. 7A and FIG. 7B is performed by the CPU 103 of the information processing apparatus 101 loading the program code stored in the ROM 104 or the external storage device 106 onto the RAM 105 and executing the program code. Alternatively, it may also be possible to perform part or all of the processing in FIG. 7A and FIG. 7B by hardware, such as an ASIC and an electronic circuit. Symbol "S" in the following explanation means each step in the sequence. In the following, by using FIG. 7A and FIG. 7B, the flow is explained in which a user activates the nail application 600 and under the control of the nail application 600, the print engine 155 prints a nail art on the fingernail inserted into the printing target insertion unit 158.

First, a user activates the nail application 600. At S701, the display control unit 610 causes the display unit 108 to display the nail art data selection screen 201 shown in FIG. 2. At S702, a user selects one piece or a plurality of pieces of the nail art data 203 the user desires to print on the nail art data selection screen 201. The nail art data selection reception unit 611 selects the selection of one piece or a plurality of pieces of the nail art data 203 by a user via the nail art data display area 202 on the nail art data selection screen 201. In a case where a user presses down the Determine button 204 after selecting one piece or a plurality of pieces of the nail art data 203, the display control unit 610 detects the pressing down and causes the display unit 108 to display the nail image data setting screen 501 shown in FIG. 5.

In the nail art data display area 502 on the nail image data setting screen 501, the one piece or the plurality of pieces of the nail art data 203 selected by a user at S702 is displayed. At S703, a user selects one piece of nail art data from the nail art data displayed in the nail art data display area 502. At S704, the nail image data setting unit 612 sets the nail image data included in the nail art data selected at S703 to the fingernail area 508.

In a case where a user presses down the setting completion button 507 after that, the display control unit 610 detects the pressing down and causes the display unit 108 to display the print data creation screen 301 shown in FIG. 3.

In the setting data display area 302 on the print data creation screen 301 at this time, the setting data, which is the one piece or the plurality of pieces of nail image data set at S704, is displayed.

In a case where the printer 151 is not registered, the nail application 600 performs search processing to search for a printer that can communicate with the nail application 600. After performing the search processing, the display control unit 610 causes the display unit 108 to display a list of printers that can communicate with the nail application 600 as the results of the search. In a case where the list of printers is displayed on the display unit 108, at S705, a user designates a printer to use from the list. Here, it is assumed that a user designates the printer 151. Then, the display control unit 610 receives instructions to designate the printer 151 by a user.

At S706, image capturing instruction unit 613 performs communication processing for the selected printer 151 and instructs the printer 151 to capture a moving image by the image capturing unit 157. At S706, it may also be possible for the image capturing instruction unit 613 to transmit a camera activation job to the printer 151 and for the printer 151 to start moving image capturing by activating the image capturing unit 157 in response to the reception of the camera activation job.

At S707, the printer 151 transmits the moving image being captured by the image capturing unit 157 to the information processing apparatus 101. This moving image is displayed in the preview area 307 on the print data creation screen 301 shown in FIG. 3. The moving image captured by the image capturing unit 157 is displayed in the preview area 307 almost real time. At this point in time, the state is such that the moving image obtained by capturing the fingertip of a user, which is inserted into the printing target insertion unit 158, is displayed in the preview area 307.

At S708, a user selects one piece of setting data that is printed on the fingernail from the setting data displayed in the setting data display area 302. At S709, the nail art data selection reception unit 611 receives instructions to select one piece of setting data by a user. The display control unit 610 highlights the setting data selected by a user.

At S710 a user inserts his/her hand into the printing target insertion unit 158 provided in the printer 151 that performs printing. At this time, in order to print the nail image data that is set at S708 more vividly, a gel-like liquid is applied in advance to the fingernail of a user. In the following, this liquid is called base coat. A plurality of colors of the base coat exists, for example, white, translucent, and the like. Further, it may also be possible for the image display control unit 614 to display a message to prompt a user to insert his/her hand into the printing target insertion unit 158 of the printer at timing after S709.

At S711, a user sets the printable area 309 in the state where the moving image transmitted at S707 is displayed in the preview area 307. Specifically, a user presses down the printable area setting button 308.

In fingernail detection at S716, to be described later, in response to pressing down of the printable area setting button 308, the printable area 309 is automatically displayed on the preview area 307 by the fingernail detection unit 615. In the present embodiment, it is assumed that the number of the printable areas 309 that can be set is specified in advance to a predetermined value and for example, the case shown in FIG. 3 corresponds to the number of fingernails of the index finger, the middle finger, the third finger, and the little finger of one hand, and therefore, the predetermined value is specified as "4". This predetermined value corresponds to the number of rails mounted in the printing target insertion unit 158 and the number of pieces of nail image data included in the setting data. In the following, explanation is given by taking an aspect as an example in which a user sets the printable areas 309 corresponding to the same number as the predetermined value, that is, an aspect in which a user sets the four printable areas 309. The number of the printable areas 309 set here is stored in the RAM 105 as a first predetermined value. That is, in this example, the first predetermined value is "4".

At S712, the image capturing instruction unit 613 sends instructions to capture a still image to the printer 151. In the image capturing instructions that are sent to the printer 151, the rail number corresponding to the image capturing-target fingernail is included. For example, in a case where numbers 1 to 4 are assigned to the four rails in order from left, at the time of capturing the little finger of the left hand, the number of "1" is sent, at the time of capturing the index finger of the left hand, the number of "4" is sent, at the time of capturing the index finger of the right hand, the number of "1" is sent, and at the time of capturing the little finger of the right hand, the number of "4" is sent.

At S713, the printer 151 performs adjustment by lifting the rail so that the height of the fingernail becomes the height in proximity to the printer head of the printer 151. By adjusting the height of the fingernail to the height in proximity to the print head, it is made possible for, in a case of an ink jet printer, the ink ejected from the print head to land onto the fingernail securely. For the height adjustment, a movable laser sensor mounted in the printer 151 is used. The laser sensor is installed at the height in proximity to the print head and the fingernail is raised to the limit height at which the laser is not shut off. In the fingernail height adjustment, it is possible to perform the height adjustment more efficiently by narrowing the movable range of the laser sensor to the fingernail range after grasping the approximate position of the fingernail than taking the entire finger as the movable range. Because of this, it is recommended to perform fingernail detection in advance before performing the fingernail height adjustment and send the fingernail position information from the nail application 600 to the printer 151 along with the image capturing instructions at S712. In the present embodiment, the fingernail detection in advance such as this is called "preliminary fingernail detection". In a case where the preliminary fingernail detection is performed, the image capturing instructions are transmitted from the nail application 600 to the printer 151 before S712. In the preliminary fingernail detection, the fingernail height adjustment is not performed, and therefore, it is not necessary to include the rail number described previously in the image capturing instructions to be transmitted for the preliminary fingernail detection. The printer 151 having received the image capturing instructions performs image capturing of a still image in the image capturing unit 157. In a case where the image capturing of the still image is completed, the printer 151 transmits the captured image to the information processing apparatus 101. The nail application 600 detects the fingernail from the received captured image and stores information (referred to as fingernail position information) indicating the positions of all the detected fingernails. Then, the nail application 600 transmits the fingernail position information on the image capturing-target fingernails to the printer 151 along with the rail numbers at the time of giving image capturing instructions at S712. The printer 151 adjusts the fingernail height by narrowing the movable range of the laser sensor using the received fingernail position information.

In a case where the fingernail height adjustment is completed, at S714, the image capturing unit 157 performs image capturing of the still image. In a case where the image capturing is completed, the heights of all the rails are returned to the initial values and at S715, the printer 151 transmits the image capturing data to the information processing apparatus 101.

At S716, the nail application 600 detects the fingernail area from the received captured image. For the fingernail area detected at this step, the printable area 309 on the print data creation screen 301 is set. As one method of fingernail detection, there is a method of detecting the white color of the base coat applied to the fingernail by image processing. Specifically, by using the RGB values of each pixel in the captured image, the pixel whose pixel values exceeds predetermined threshold values (for example, R>200, G>200, B>200) is detected and the detected pixel is determined to be the pixel in the fingernail area. In order to prevent the rail under the finger from being detected erroneously as a fingernail at the time of fingernail detection, it is recommended to set the color of the rail to a color other than white, such as black. Further, in order to prevent the area in which the captured image becomes the white area due to the reflection of light from being detected erroneously, it is desirable to configure the rail from a material that reflects light diffusedly. Further, in the detection by image processing, detection becomes difficult in a case where the base coat is translucent, and therefore, it may also be possible to use machine learning as another detection method. By using finger images including fingernails to which the white or translucent base coat is applied as the images that are learned in machine learning, it is made possible to detect the fingernail area even in a case of the translucent base coat, not only in a case of the white base coat. In machine learning, a learning model is constructed by causing the learning model to learn where the fingernail exists in a prepared learning image. The constructed learning model is incorporated in the nail application 600 and processed by the CPU 103 or the GPU 110 and then made use of to detect the fingernail area from the captured image. The color of skin and the shape of fingernail are different for different persons, and therefore, by preparing patterns of many hands as learning images and causing the learning model to learn them, it is made possible to detect the fingernail of any user. In the machine learning, a number of frameworks exist, and therefore, by making use of already-existing frameworks, it is possible to implement machine learning.

The processing at S712 to S716 is performed repeatedly the number of times corresponding to the number of image capturing-target fingernails. For example, in a case where the four fingernails of the little finger to the index finger of the left hand are a target, image capturing, transmission of image capturing data, and finger detection are performed repeatedly for each finger. In this case, a total of four captured images are obtained, but at the time of the printable area setting unit 616 setting the printable area 309, the portion in which the target fingernail is captured is cut out from each captured image and displayed in the preview area 307. That is, in the preview area 307, four finger images cut out from the four captured images are displayed side by side and the printable area 309 is set to each fingernail image.

After the printable area 309 is set by the printable area setting unit 616, at S717, the reflection data reception unit 617 associates the nail image data that is set as the setting data and the printable area 309 that is set with each other. Then, the reflection execution unit 618 reflects the setting data in the printable area 309 based on this association. In the case shown in FIG. 3, association is performed between each of the four kinds of nail image data included in the setting data 302(c) and each of the four printable areas 309 that are set.

At S718, a user edits the printable area 309 as needed. Specifically, it is possible for a user to adjust the size or the like of the printable area 309 and increase in number the printable area 309. At this time, the reception of editing instructions is performed by the reflection data reception unit 617 and the reflection of the edited results is performed by the reflection execution unit 618. In the editing at this step, it is also possible to adjust which portion of the nail art in the nail image data is reflected for the printable area, not only to adjust the size of the printable area.

At S719, a user presses down the print button 310. In response to the pressing down of the print button 310, the printing instruction unit 619 creates print data for printing an image in which the setting data selected by a user from the setting data displayed in the setting data display area 302 is reflected in the printable area 309. To explain this by taking a specific example, after reflecting the setting data selected by a user from the setting data displayed in the setting data display area 302 in the printable area 309 and checking the display contents, the user presses down the print button 310. The printing instruction unit 619 creates print data in response to the pressing down of the print button 310. At this time, it may also be possible for the nail application 600 to display a message to the effect that "Do not move your hand inserted into the printing target insertion unit 158". As the print data, it is necessary to create print data whose image size is the same as the printable range of the printer 151 and correctly arrange the printable area 309 so that the printing position does not deviate. Consequently, in order to specify the printable range of the printer 151, a red frame indicating the printable range is provided in the printer 151 and the printable area is specified by detecting the red frame by image processing from the image captured in the image capturing unit 157. At the time of detecting the red frame, the red frame is detected from the outside of the captured image. By detecting the red frame from the outside as described above, even in a case where the red painting invades the inside of the red frame, it is possible to accurately detect the red frame. By arranging the printable area 309 in the print data based on the detected printable range, it is made possible to perform printing at the correct position.

At S720, the image capturing instruction unit 613 sends instructions to capture a still image to the printer 151. The image capturing in accordance with the instructions that are sent at this step is image capturing that is performed in order to determine whether a deviation in the fingernail position has occurred during the period from the fingernail detection at S716 until the print button 310 is pressed down at S719. As at S712, in the image capturing instructions that are sent to the printer 151 at this step, the rail number corresponding to the image capturing-target fingernail is included.

At S721, the printer 151 lifts the rail to the same height as that at the time of lifting the rail at S713. Due to this, the fingernail position is set again to the position suitable for printing.

At S722, the image capturing unit 157 performs image capturing of a still image.

At S723, the printer 151 transmits image capturing data to the information processing apparatus 101.

At S724, the nail application 600 performs fingernail detection. The fingernail detection performed at this step is performed by the same method as that of the fingernail detection performed at S716.

At S725, the printing instruction unit 619 corrects the print data so that the print data fits to the fingernail area detected at S724. The print data correction processing at this step will be described later by using FIG. 8A to FIG. 8C and FIG. 9.

At S726, the nail application 600 transmits the print data corrected at S725 to the printer 151.

The above processing at S720 to S726 is the processing relating to the print data correction, but in a case where a user edits the position or size of the printable area 309 at S718, there is a possibility that the fingernail area has not been detected correctly in the fingernail detection, and therefore, the processing relating to the print data correction is skipped. In that case, the processing at S720, S722 to S725 is skipped and at S726, the print data created at S719 is transmitted without correction in place of the print data corrected at S725. Further, in a case where the fingernail detection has failed at S724, there is a possibility that the hand has been pulled out from the printing target insertion unit 158, and therefore, the nail application 600 displays an error message to the effect that printing is aborted on the display unit 108 and skips the processing at the subsequent steps.

At S727, the printer 151 performs printing based on the transmitted print data. As a result of this step, the nail art represented by the nail image data is printed on the fingernail of a user.

The processing at S720 to S727 is performed the number of times corresponding to the number of printing-target fingernails. For example, in a case where the four fingernails of the little finger to the index finger of the left hand are a target, image capturing, transmission of image capturing data, fingernail detection, transmission of print data, and printing are performed repeatedly for each finger. In a case where the printer 151 performs printing from the bottom of the fingernail toward the tip of the fingernail, the movement distance of the print head is shorter by performing printing in order of the little finger, the third finger, the middle finger, the index finger than that by performing printing in order of the index finger, the middle finger, the third finger, and the little finger because of the arrangement relationship of the fingers. On the contrary, in a case where the printer 151 performs printing from the tip of the fingernail toward the bottom of the fingernail, the movement distance of the print head is shorter by performing printing in order of the index finger, the middle finger, the third finger, and the little finger than that by performing printing in order of the little finger, the third finger, the middle finger, and the index finger. As described above, the order of the fingers to be printed is changed by taking into consideration that the finger arrangement is different depending on the printing-target hand (left hand/right hand). Due to this, it is possible to reduce the movement distance of the print head, resulting in a reduction in the printing time.

The printer 151 continues fingernail image capturing also during printing and in a case where it is detected that the hand is pulled out from the printing target insertion unit 158 of the printer 151 before printing is completed, it may be possible to terminate printing. Further, it may also be possible for the nail application 600 to detect that the hand is pulled out from the printing target insertion unit 158 of the printer 151 before printing is completed and give instructions to terminate printing to the printer 151.

<Correction Processing of Print Data>

Figure 8A:
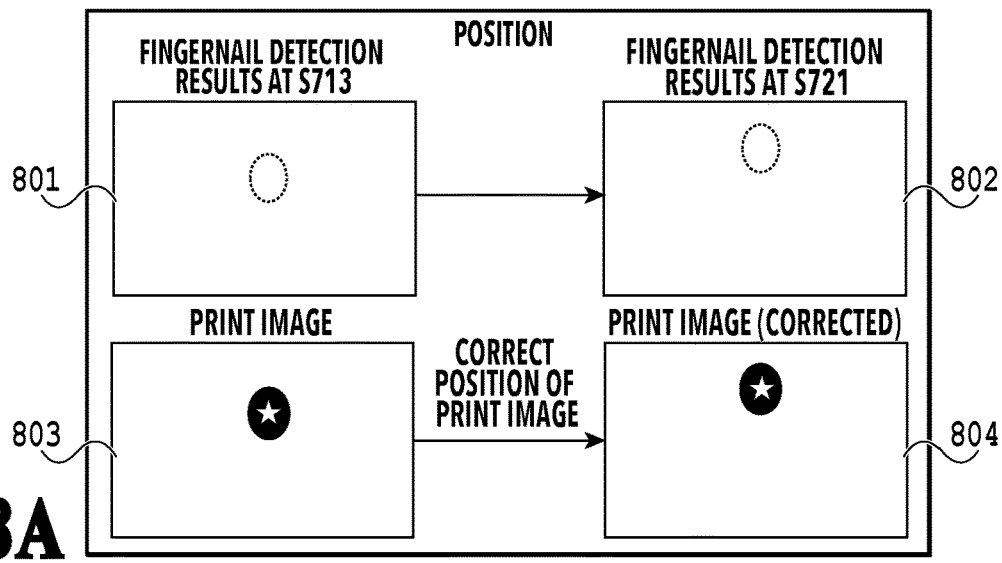
FIG. 8A to FIG. 8C are diagrams explaining correction processing of print data.
Figure 8B:
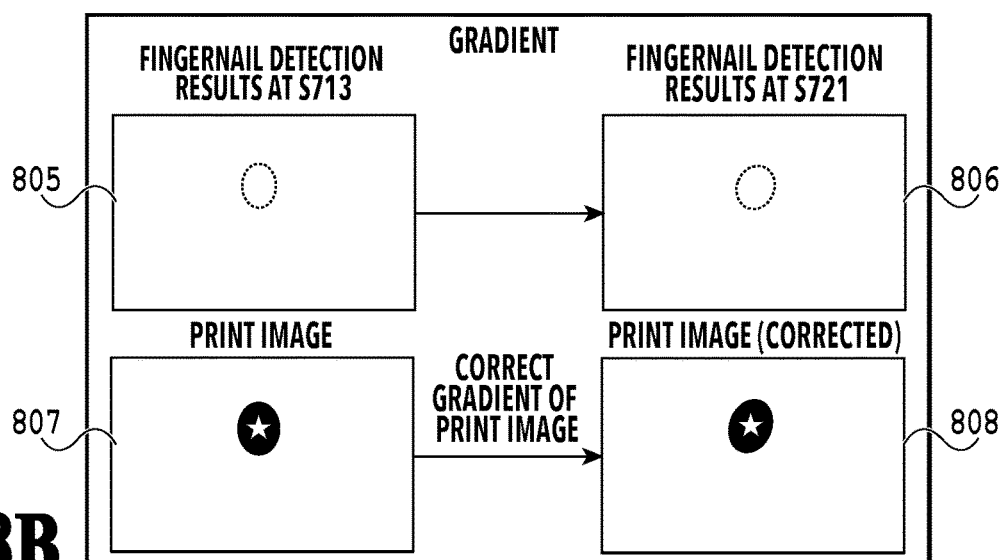
Figure 8C:
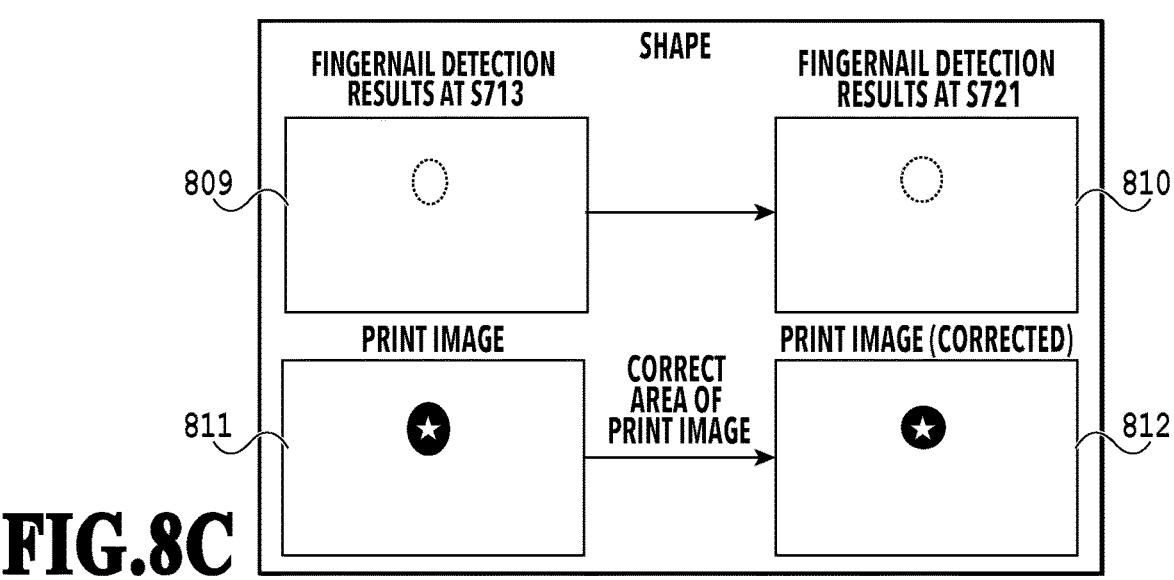

FIG. 8A to FIG. 8C are diagrams showing the outline of the print data correction processing at S725. Specifically, FIG. 8A to FIG. 8C show correction examples of a print image in a case where there is a change in the position, the gradation, and the shape of the fingernail based on the comparison between the results of the fingernail detection at S716 and the results of the fingernail detection at S724.

FIG. 8A shows an example in a case where the fingernail position changes between fingernail detection results 801 at S716 and fingernail detection results 802 at S724. In a case where the fingernail position changes, the printing instruction unit 619 acquires a corrected print image 804 by adjusting the position of the nail art in a print image 803 created at S719, that is, by moving the position by the distance by which the fingernail position deviates. By correcting the print image as described above, it is possible to perform printing by adjusting the position to the fingernail position immediately before the printing even in a case where the fingernail position changes during the period from the detection of the fingernail at S716 until the printing is started.

FIG. 8B shows an example in a case where the fingernail gradient changes between fingernail detection results 805 at S716 and fingernail detection results 806 at S724. In a case where the fingernail gradient changes, the printing instruction unit 619 acquires a corrected print image 808 by adjusting the position of the nail art in a print image 807 created at S719, that is, by rotating the position by the amount by which the fingernail gradient changes. By correcting the print image as described above, it is possible to perform printing by adjusting the gradient to the fingernail gradient immediately before the printing even in a case where the fingernail gradient changes during the period from the detection of the fingernail at S716 until the printing is started.

FIG. 8C shows an example in a case where the fingernail shape changes between fingernail detection results 809 at S716 and fingernail detection results 810 at S724. In a case where the fingernail shape changes, the printing instruction unit 619 acquires a corrected print image 812 by adjusting the shape of the nail art in a print image 811 created at S719, that is, by changing the shape so as to fit to the changed fingernail shape. By correcting the print image as described above, it is possible to perform printing by adjusting the shape to the fingernail shape immediately before the printing even in a case where the fingernail shape changes during the period from the detection of the fingernail at S716 until the printing is started. As a case where the fingernail shape changes, mention is made of a case where the fingernail shape captured by the camera of the image capturing unit 157 changes because the finger is bent or the like during the period from the detection of the fingernail until the printing is started, and the like.

There is a possibility that the position, the gradient, and the shape of the fingernail change respectively, and therefore, the correction processing is performed by combining each piece of the correction processing in FIG. 8A to FIG. 8C. For example, in a case where the position and the gradient of the fingernail change, the printing instruction unit 619 performs both the correction processing in FIG. 8A and the correction processing in FIG. 8B.

Further, in FIG. 8A to FIG. 8C, the examples are shown in which the print image created in advance is corrected, but it may also be possible for the printing instruction unit 619 to create a print image anew by reflecting the nail image data in the area detected in the fingernail detection (fingernail detection immediately before printing) at S724. In this case, it is possible to simplify the processing because the correction processing is no longer necessary, but the arrangement results of the nail art data for the printable area 309, which are acquired by the editing at S718, are no longer reflected in the print image correctly.

Figure 9:
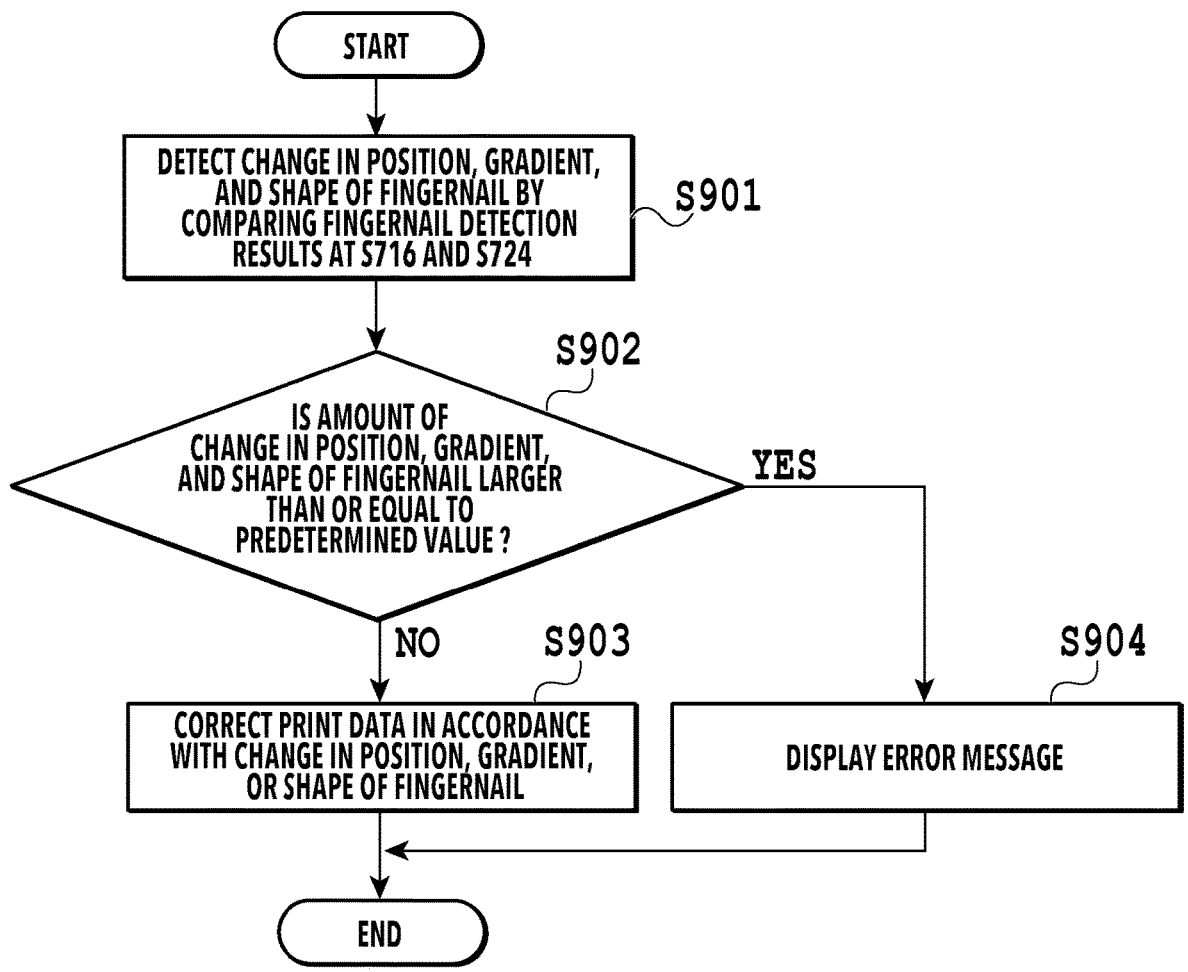
FIG. 9 is a flowchart of correction processing of print data.

FIG. 9 is a flowchart of the print data correction processing. At S901, the printing instruction unit 619 compares the fingernail detection results at S716 and the fingernail detection results at S724 and detects a change in the position, the gradient, and the shape of the fingernail, respectively. For example, in a case of the fingernail position, the distance between the center positions of the fingernails in the two fingernail detection results is derived. Further, in a case of the gradient, the difference in the angle between the fingernails is derived and in a case of the shape, the difference in the size between the rectangles surrounding the fingernails is derived.

Following the above, at S902, the printing instruction unit 619 determines whether the amount of change is larger than or equal to a predetermined threshold value for each of the position, the gradient, and the shape of the fingernail. In a case where the amount of change in even one of the position, the gradient, and the shape is larger than or equal to the predetermined threshold value, the determination results at this step will be affirmative. In a case where the determination results at this step are affirmative, the processing advances to S904 and on the other hand, in a case where the determination results are negative, the processing advances to S903. For example, in a case where the predetermined threshold value for the fingernail position is set to 3 mm, whether the distance between the center positions derived at S901 is longer than or equal to 3 mm is determined. Similarly, in a case where the threshold value for the gradient is set to ten degrees, whether the difference in the angle derived at S901 is larger than or equal to ten degrees is determined. For the threshold value of the shape, a threshold value is set to the vertical width and the horizontal width, respectively, of the rectangle surrounding the fingernail and whether there is a change larger than or equal to the value is determined.

In a case where the determination results at S902 are affirmative, it is regarded that the fingernail has moved more than a permitted range of correction, and at S904, the printing instruction unit 619 causes the display unit 108 to display an error message to the effect that printing is aborted. In this case, it is not possible to perform the subsequent printing processing, and therefore, the subsequent printing processing is skipped.

In a case where the determination results at S902 are negative, at S903, the printing instruction unit 619 corrects the print data in accordance with the change in the position, the gradient, or the shape of the fingernail. The correction processing at this step is as explained in FIG. 8A to FIG. 8C.

Effects of the Present Embodiment

As explained above, in the present embodiment, the print data is corrected in accordance with the change in the position and the like of the fingernail immediately before starting printing. Due to this, even in a case where the fingernail position or the like changes during the period from the image capturing for creating print data until immediately before the start of printing, it is possible to correctly print the nail art on the fingernail. For example, even in a case where the fingernail is inclined, it is possible to print the nail art data on the fingernail in the correct orientation.

Other Embodiments

In the embodiment described previously, explanation is given by taking the printer 151 as an example, whose aspect is such that one hand is inserted into the printing target insertion unit 158, but the present disclosure is not limited to this aspect. For example, the aspect of the printer may be one, such as a printer that is installed in a shop, in which both hands are inserted into the printing target insertion unit. In this case, it may be possible for an employee in the shop to perform the GUI operation of the nail application.

Further, in the embodiment described previously, explanation is give by taking the case as an example where the image (pattern) is printed mainly as a nail art, but an aspect may also be accepted in which a structure including patterns is formed as a nail art by using shape data and image data representing a three-dimensional structure and the like.

Further, in the embodiment described previously, the aspect is explained in which a hand is inserted into the printing target insertion unit 158 of the printer 151 and printing is performed directly on the fingernail, but another aspect may be accepted. For example, it is possible to apply the concept of the embodiment described previously in a case where printing is performed by using a printer that performs printing for an object that is attached to the fingernail, for example, such a seal.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, in a case where the fingernail position or the like changes during the period from the detection of a printing-target fingernail area until printing is performed, it is made possible to perform printing correctly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130541, filed Jul. 31, 2020, which is hereby incorporated by reference herein in its entirety.

What is claimed is:

1. A non-transitory computer readable storage medium storing a program for causing a computer of an information processing apparatus to function as:
   a first detection unit configured to detect a printing-target fingernail area from a first captured image;
   a creation unit configured to create print data for performing printing in a fingernail area detected by the first detection unit;

a second detection unit configured to detect a printing-target fingernail area from a second captured image before transmitting the print data to a printer; and a correction unit configured to correct the print data based on a difference between first detection results by the first detection unit and second detection results by the second detection unit;

a third detection unit configured to detect a change in position, gradient, and shape of a fingernail based on the first detection results and the second detection results; and a determination unit configured to determine whether one of an amount of change in position, an amount of change in gradient, and an amount of change in shape of a fingernail is larger than or equal to a predetermined threshold value.

2. The storage medium according to claim 1, wherein the correction unit corrects the print data in accordance with each of the changes in a case where determination results by the determination unit are negative.

3. The storage medium according to claim 1, storing a program for causing a computer of the information processing apparatus to further function as:

a display control unit configured to display an error message to the effect that printing is aborted on a GUI screen in a case where determination results by the determination unit are affirmative.

4. The storage medium according to claim 1, storing a program for causing a computer of the information processing apparatus to further function as:

a display control unit configured to display an error message to the effect that printing is aborted on a GUI screen in a case where the second detection unit cannot detect a fingernail area.

5. The storage medium according to claim 1, wherein in a case where the print data is edited by a user, detection by the second detection unit and correction of the print data by the correction unit are not performed.

6. The storage medium according to claim 1, storing a program for causing a computer of the information processing apparatus to further function as:

a first transmission unit configured to transmit image capturing instructions for acquiring a first captured image to the printer; and a second transmission unit configured to transmit image capturing instructions for acquiring a second captured image to the printer.

7. An information processing apparatus comprising:

at least one processor causing the information processing apparatus to act as:

a first detection unit configured to detect a printing-target fingernail area from a first captured image;

a creation unit configured to create print data for performing printing in a fingernail area detected by the first detection unit;

a second detection unit configured to detect a printing-target fingernail area from a second captured image before transmitting the print data to a printer; and a correction unit configured to correct the print data based on a difference between first detection results by the first detection unit and second detection results by the second detection unit;

a third detection unit configured to detect a change in position, gradient, and shape of a fingernail based on the first detection results and the second detection results; and a determination unit configured to determine whether one of an amount of change in position, an amount of change in gradient, and an amount of change in shape of a fingernail is larger than or equal to a predetermined threshold value.

8. A control method of an information processing apparatus, the control method comprising:

a first detection step of detecting a printing-target fingernail area from a first captured image;

a creation step of creating print data for performing printing in a fingernail area detected at the first detection step;

a second detection step of detecting a printing-target fingernail area from a second captured image before transmitting the print data to a printer; and a correction step of correcting the print data based on a difference between first detection results at the first detection step and second detection results at the second detection step;

a third detection step of detecting a change in position, gradient, and shape of a fingernail based on the first detection results and the second detection results; and a determination step of determining whether one of an amount of change in position, an amount of change in gradient, and an amount of change in shape of a fingernail is larger than or equal to a predetermined threshold value.

\* \* \* \* \*